UNITED STATES PATENT OFFICE.

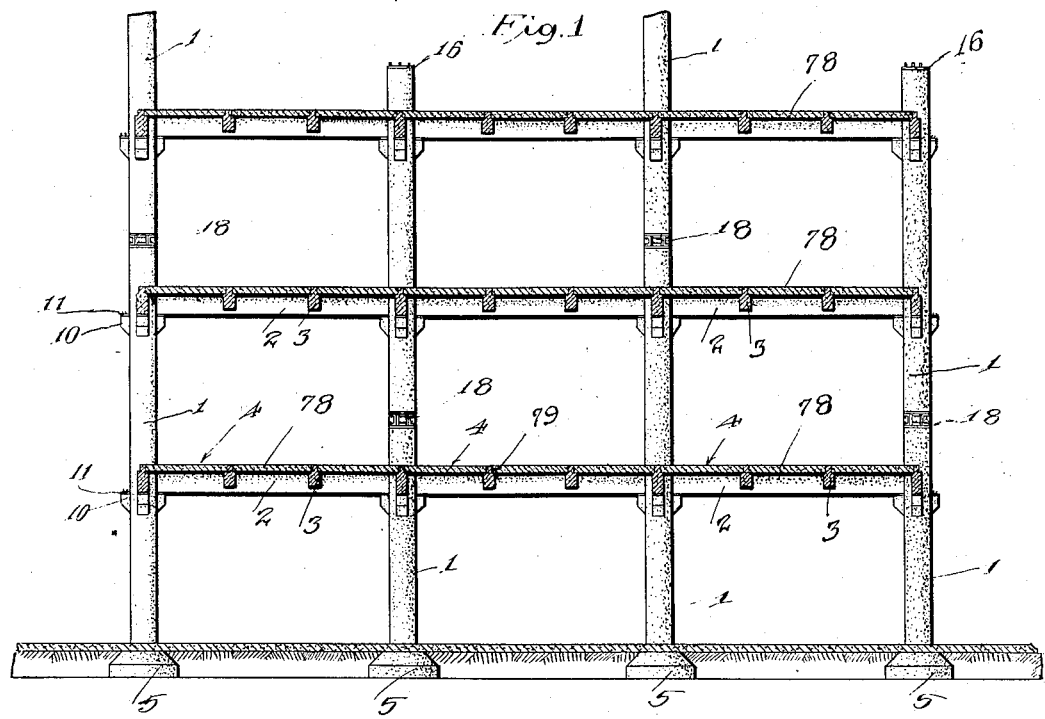
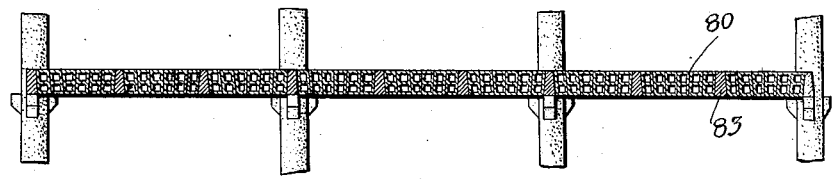
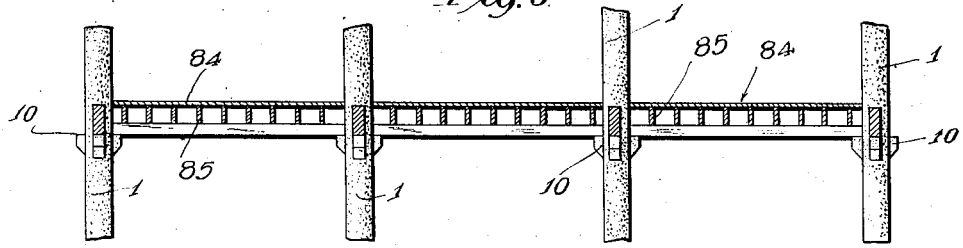
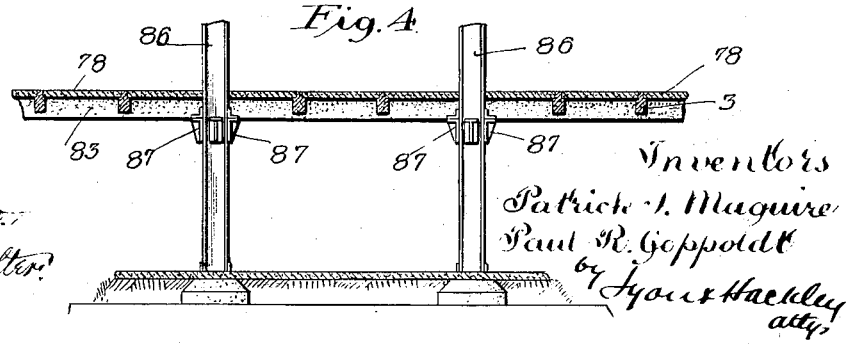

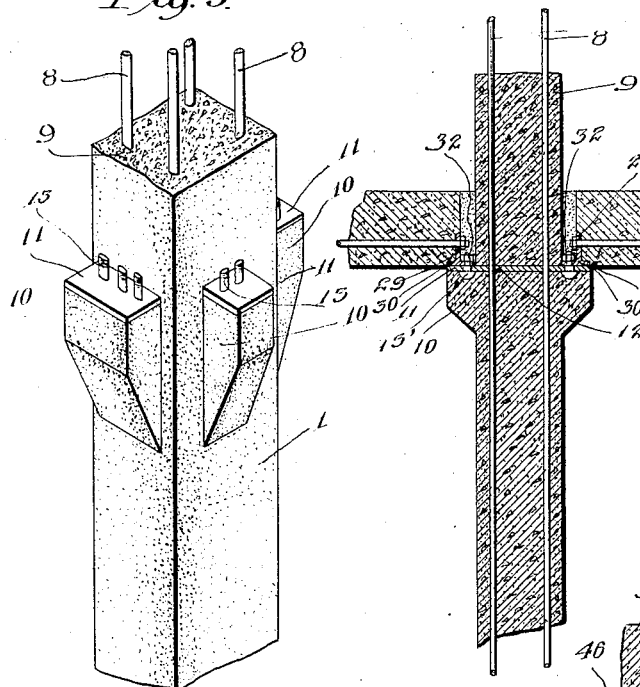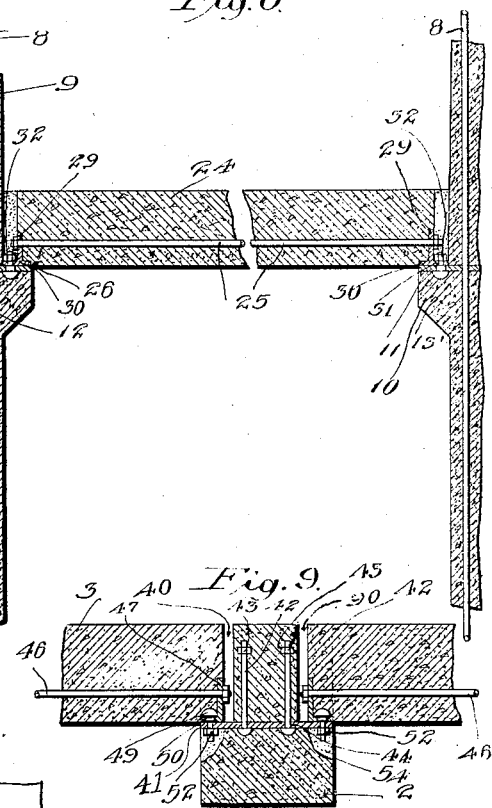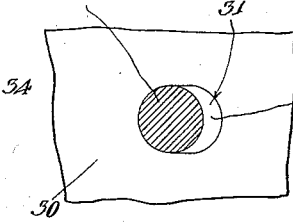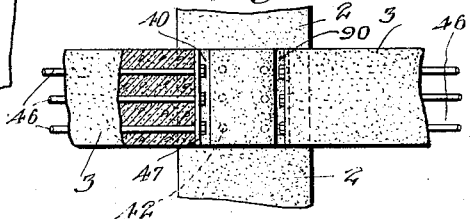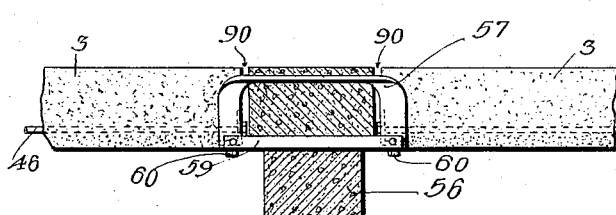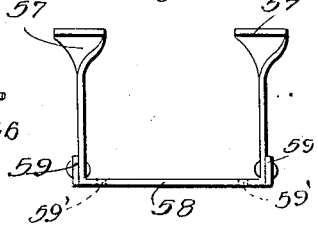

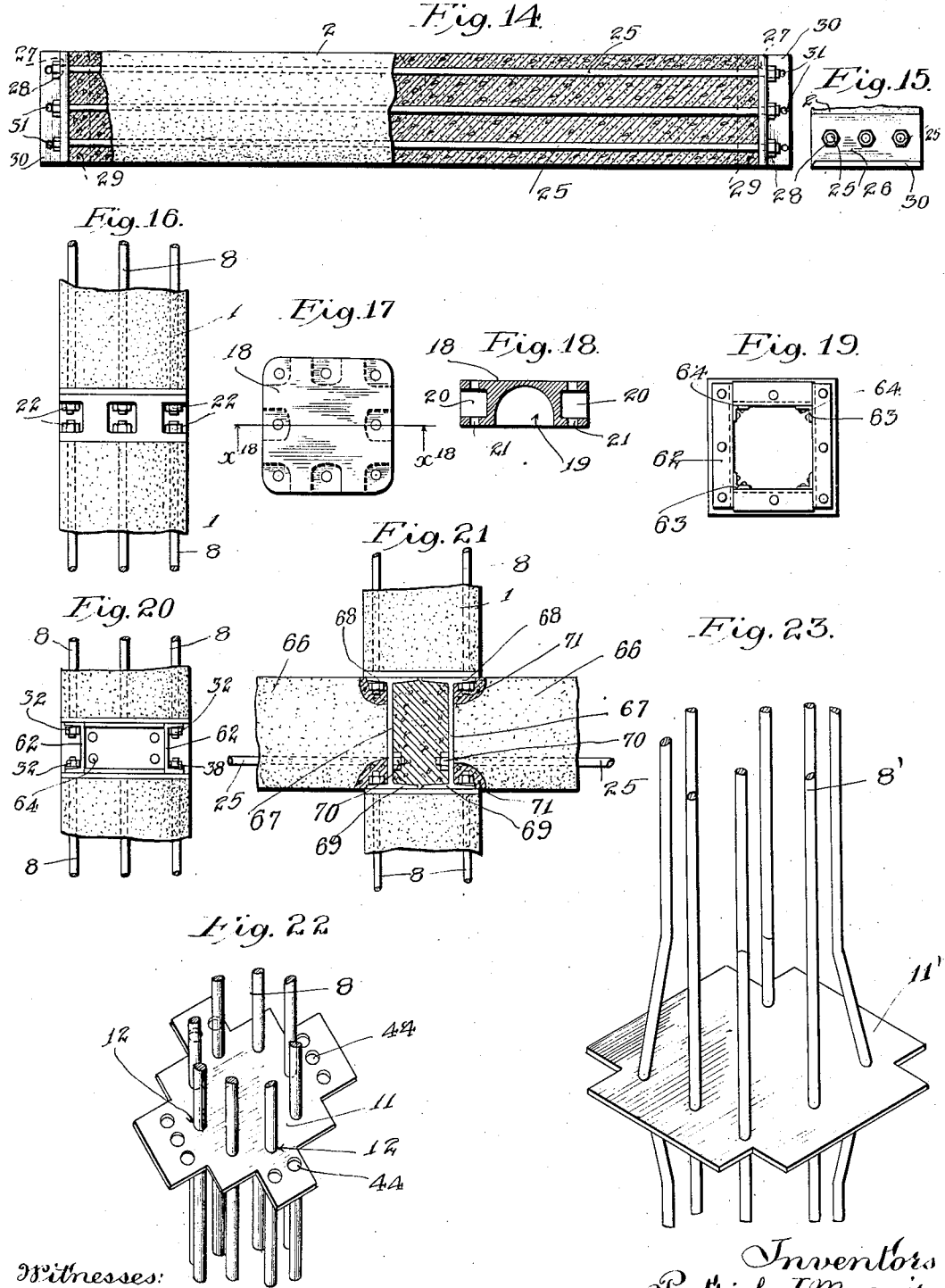

PATRICK J. MAGUIRE AND PAUL R. GOPPOLDT, OF LOS ANGELES, CALIFORNIA.

REINFORCED-CONCRETE BUILDING CONSTRUCTION.

1,205,465.     Specification of Letters Patent.     Patented Nov. 21, 1916.

Application filed June 30, 1913. Serial No. 776,476.

*To all whom it may concern:*

Be it known that we, PATRICK J. MAGUIRE, a subject of the King of the United Kingdom of Great Britain and Ireland, and PAUL R. GOPPOLDT, a citizen of the United States of America, both residing at Los Angeles, in the county of Los Angeles and State of California, have invented a new and useful Reinforced-Concrete Building Construction, of which the following is a specification.

This invention relates to reinforced concrete building constructions and the main object of the invention is to provide a construction of this character which is adapted to be put up in the manner of a steel frame structure, the building elements, including the columns, girders, beams, etc., being preformed and built up to form the structure in substantially the same manner as has been customary with steel frame structures.

A further object of the invention is to provide a building construction which will have the fireproof and durable qualities of reinforced concrete construction and which will be comparatively inexpensive in construction, by reason of the elimination of false-work, and centering or mold devices, such as have heretofore been generally used for putting up reinforced concrete buildings.

Other objects of the invention will appear hereinafter.

The accompanying drawings illustrate embodiments of our invention, and referring thereto: Figure 1 is a vertical section of several floors of the structure. Fig. 2 is a vertical section of a portion of one floor showing a different form of floor construction. Fig. 3 is a vertical section of a portion of one floor showing another form of floor construction. Fig. 4 is a vertical section showing another construction for the columns. Fig. 5 is a perspective view of a portion of one of the preferred columns. Fig. 6 is a vertical section showing the construction of the columns and girders resting thereon. Figs. 7 and 8 are detail horizontal sections showing the different manner in which fastening bolts are locked rigidly in position. Fig. 9 is a vertical section showing the manner in which the beams are supported on the girder. Fig. 10 is a plan view of the construction shown in Fig. 9. Fig. 11 shows another construction for hanging the beams on a girder. Fig. 12 is a plan view of the construction shown in Fig. 11. Fig. 13 is a side elevation of one of the hangers shown in Fig. 11. Fig. 14 is a plan view partly in section, of one of the girders. Fig. 15 is an end elevation thereof. Fig. 16 is an elevation of portions of two column sections and a connecting joint. Fig. 17 is a plan view of the joint member for connecting the column sections. Fig. 18 is a section on line $x^{18}$—$x^{18}$ in Fig. 17. Fig. 19 is a plan view of a joint member constructed of structural steel. Fig. 20 is a side elevation showing the application of the structural steel joint member to adjacent columns. Fig. 21 is a side elevation showing a construction of a joint for the columns, adapted to receive and support the ends of the girders within the joint. Fig. 22 is a perspective view of one form of bonding and supporting plate with the reinforcing rods extending therethrough. Fig. 23 is a view similar to Fig. 22, showing another form of the said parts in which the reinforcing rods are bent to give additional support to the girder supporting brackets.

Referring to Fig. 1, the building is constructed according to our invention, with preformed vertical columns 1 having brackets, horizontal girders 2 resting on the brackets of said columns, cross beams 3 extending between said girders, and floor members 4 supported on said cross beams and girders. The lowermost columns 1 may rest on suitable bases indicated at 5, and the upper columns are connected to the columns below the same by joints indicated at 6. In order to expedite the building operation and produce a rigid and strong structure, the columns are generally made to span more than a single floor, for example two floors, and the joints are staggered in different columns so as to increase the rigidity of the structure. Thus, as shown in Fig. 1, the column at the left is made sufficiently long to extend from the foundation 5 through the first and second floors and somewhat above the second floor to the first joint 6. The next column extends through the first floor and somewhat above the same, and the succeeding column extends to the same height as the first column. Above the lowermost column, the columns may be all of uniform height so that the break joint arrangement is maintained until the top of the building is reached, where columns of different length are provided to bring all of the columns to uniform or desired height at the roof.

Each column 1 is formed of reinforced concrete, for example, in the manner shown in Figs. 5 and 6, comprising a plurality of vertical reinforcing rods 8, a body 9 of concrete molded onto said rods and brackets 10 of concrete molded with said body and projecting laterally therefrom. A horizontal bearing plate 11 having projecting arms is molded into said body so as to extend transversely through the column and is provided with perforations 12 through which the vertical rods 8 aforesaid extend, said rods preferably engaging the walls of said perforations. Bolts 13 are molded into said columns with their heads 13' below said bearing plate, said bolts extending up through the bearing plates, and projecting above the same sufficiently to engage portions of the girders as hereinafter set forth. The reinforcing rods 8 project at each end of each column and extend through metallic bearing plates 16 at each end of the column, and are screw threaded at their ends. At each joint between the columns, as shown in Figs. 16, 17 and 18, a joint member 18 is provided, consisting, for example, of a metal casting which may be hollowed out for the sake of lightness, as indicated at 19, and is provided with recesses 20 in its sides and with perforations 21 beneath and above the recesses to receive the ends of the respective reinforcing rods 8, these rods extending through said perforations 21, and nuts 22 being screwed on said rods and engaging with the upper and lower walls of the recesses 20 to hold the columns tightly against the joint member and bind all of the columns in a vertical row into a single rigid column. The arms of the bearing plates 11 extend out over the brackets 10 to form supports for the girders.

Each girder, as shown in Figs. 6, 14 and 15, is formed of a concrete body of any suitable cross section having longitudinal reinforcing rods 25 embedded therein, and provided at each end with a bearing plate 26 of inverted T-shape secured to the body by the reinforcing rods 25 which extend through perforations 27 in said bearing plate and receive nuts 28 which hold the bearing plate firmly in position on the girder, the reinforcing rods 25 being in the lower or tension zone of the girder, and the bearing plate 26 being near the bottom edge of the girder at each end. Each bearing plate 26 is provided with a horizontal flange 29 extending inwardly and embedded in the concrete body 24 of the girder and with a horizontal flange 30 extending outwardly, said flanges 29 and 30 lying in the same plane and their lower faces forming a bearing face adapted to rest on the top of the arms of the bearing plate 11 aforesaid.

Each outwardly extending flange 30 is provided with perforations 31 for receiving the respective fastening bolts 13 aforesaid and when the girders have been placed in position with said bolts extending through said perforations, nuts 32 are screwed onto said bolts to clamp the top of the arm bearing members 26 tightly down on the bearing plate 11, thereby rigidly securing the girder to the bracket of a column at each end. In order to insure a tight connection, the perforations 31 in the flange 30 aforesaid are preferably made elongated as shown, for example, in Figs. 7 and 8, so that the bolt 13 may pass freely therethrough, notwithstanding slight variations in the lengths of the girders or in the positions of the columns, and shims or filler plates or segments indicated at 34 in Figs. 7 and 8 are driven in at one or both sides of the bolt to tightly fill the space between the bolt and the walls of the perforations 31 forming a rigid joint. Fig. 8 shows the construction of this tight joint for a round bolt and Fig. 7 shows the construction of the same for a square shank bolt.

The beams 3 are of similar construction to the girders 2, and are supported at their ends on the girders, for example, in the manner shown in Figs. 9 and 10, the girders 2 having recesses 40 formed in their sides and provided with bearing plates 41 embedded in the girder and extending outwardly at the bottom of said recesses 40 to support the beams. Stirrups in the form of bolts 42 with anchor plates 43 are provided in the girder, said anchor plates being in the top portion of the girder and said bolts extending through said anchor plates 43 and through the bearing plate 41 and having heads at their lower ends engaging beneath the bearing plate to support the plate 41. Said plate 41 is provided with perforations 44. Each beam 3 is provided with longitudinal reinforcing rods or bolts 46 which extend through angle bearing plates 47 at the respective ends of the beam, so as to tie said bearing plates to the beam, and bolts 49 extend through perforations 50 in said bearing plate and through the perforations 44 aforesaid in the bearing plate 41 on the girder and are secured thereto by nuts 52, so as to firmly secure the beam to the girder. Recesses 54 are provided in opposite sides of the girder to receive and enable access to the nuts 52. Bolts 49 are tightly secured in the holes 50 by the above described means shown in Figs. 7 and 8.

When a T girder is used, the construction for hanging the beams on the girder may be as shown in Figs. 11, 12 and 13, the head of the T girder 56 having embedded therein, hanger plates 57 which project beyond the girder at each side and downwardly and are connected at their lower ends by a bearing plate 58. Thrust bars 59 also extend through the T girder 56 and are connected at their ends to the downward extensions of the plates 57 at the ends of the bearing portions 58, so as to sustain the in-thrust due to the pressure of the beams on the bearing portions 58. The bearing portions 58 are perforated, as shown at 59', to receive fastening bolts 60 whereby the beams 3 are secured to the bearing portions 58 of the hangers in the same manner as above described in connection with the form shown in Figs. 9 and 10.

The construction as above described may be variously modified, for example, as shown in Figs. 19 and 20, the joint members for connecting the adjacent columns may be formed of structural steel, for example, channel beams 62 connected together at the corners by angle plates 63 and riveted to one another and to said angle plates, as shown at 64. The flanges of the channel beams are turned outwardly, as shown in Fig. 20, to form recesses into which extend the reinforcing rods 8 from the columns, the nuts 32 being screwed on said rods and engaging with said flanges to hold the column sections rigidly on the joint member. The joint member may also be formed as shown in Fig. 21, so as to form a part of the girders, the girders indicated at 66 being provided with I-beams 67 at the end of the girders, the upper and lower flanges 68 and 69 of said I-beams serving as bearing plates for the columns extending through said flanges 68 and 69 and being secured in position by nuts 70 located within recesses 71 in the girder bodies 66. The construction of the columns may also be modified, for example, with reference to the reinforcing therein, as shown in Figs. 22 and 23, Fig. 22 illustrating a construction wherein the reinforcing rods 8 are arranged in a circular series, and Fig. 23 illustrating a construction wherein the reinforcing rods indicated at 8' are bent out where they pass through the bearing plate 11' to give a more effective support for said bearing plate.

Any suitable floor members may be used in connection with the above described skeleton frame for the building. Thus, as shown in Fig. 1, the floor may consist of slabs 78 of reinforced concrete or other suitable material supported on the beams 3 and girders 2, said slabs being set into rabbets 79 on said slabs and girders. Or, as shown in Fig. 2, the floor may consist of the usual hollow tiles indicated at 80, set in place between the girders 82 and beams 83. Or, as shown in Fig. 3, the floor, indicated at 84, may be laid on top of the beams 85.

Fig. 4 illustrates an application of the invention wherein the girders constructed as above described are supported on steel columns 86 which are provided with brackets 87 to which the girders 88 are secured in the manner shown for girders 2 in Fig. 6. In building the structure, the lowermost columns are secured in position on the base 5, said base 5 being, for example, provided with means for engaging the columns similar to the engagement therewith of the joint members 6. The girders 2 are then placed on the bearing plates 11 of the columns and when so placed, the flanges 29 and 30 of the girders rest on the bearing plate 11 and the perforations 31 in the flanges 30 come directly under the fastening bolts 13, said bolts extending through said perforations. The holes 31 being elongated, openings are left at one or both sides thereof, which are filled by the filler plates 34 which are driven tightly into place and the nuts 32 are then screwed on or the end of the bolt is upset to form a rivet so that in either case the girder is firmly secured to the column. When the girders are so placed, a space indicated at 90 is left between the end of the girder and the adjoining face of the column, and this space is then filled with suitable filling means, preferably grouting, so as to bind the structure into a substantially monolithic reinforced concrete structure. The beams 3 are placed on the girders 2 and secured thereto by the bolts 50 passing through the perforations in the bearing plates 41 and secured by nuts or riveting and the spaces 90 left between the ends of the beams and the walls of the recesses 40 in the girders are filled with suitable filling means, preferably grouting, so as to bind the beams and girders into a substantially integral reinforced concrete structure. It will be noted that in a construction so formed, the concrete members, although they are preformed, are eventually brought into integral continuity by the grouting bonds above described, and the metallic reinforcements for the girders are brought into metallic continuity through the intervening bearing plates 11 in the columns which are metallically secured to the reinforcing rods 25 in the girders. Similarly, the reinforcing rods 8 in the columns are in metallic connection throughout the height of the vertical series of columns by their connection to the intervening joint members 6, and they are metallically connected to the reinforcing rods of the girders by the engagement of the reinforcing rods 8 with the transverse bearing plates 11 in the columns, which are metallically connected to the reinforcing rods 25 of the girders. Similarly the reinforcing rods 46 of the beams are metallically connected to the reinforced rods of the opposite beams by the connection of said rods to the transverse bearing plates 41 in the girders, so that the reinforcements of the entire structure form a continuous metallic structure, so connected as to directly resist the tensile strains and distribute such strains uniformly throughout the structure, while the compression strains are distributed by the continuity of the reinforced concrete members.

In the above described respect, our invention is distinguished from the ordinary reinforced concrete building in which the metallic reinforcements are bonded together by cement or concrete bonds, metallic reinforcements of any one member being interlinked loosely with the metallic reinforcements of adjacent members and connected thereto only by cement filling which is poured in between said parts. In such construction, any deficiency, breakage or cracking of the cement bond impairs or destroys the effectiveness of the metallic reinforcements in distributing and carrying the tensile strains from one part to another, whereas in our invention the effectiveness of the metallic reinforcements in distributing and carrying the tensile strains from one part to another is not dependent in any way upon the cement or concrete, the latter being relied upon only to take compressive strains and to preserve the form of the metallic reinforcements.

Structures to be made according to our invention are stronger than the ordinary monolithic structures, because they are composed of simple preformed members. Due to this there can be no development of complex and internal stresses such as in monolithic concrete structures. Moreover, by the use of our method of construction tall buildings can be built in one third of the time required by the present monolithic concrete method. For example, a twelve story building is poured at the rate of one story each month and by our invention this same building can be done in four months or faster if desired, since the rapidity of concrete construction is governed by the time required for it to set. Therefore we can pour all the members in succession if necessary, thus having the entire building members set or seasoned at the time that they can proceed with the second story of the monolithic structure. Therefore, a building requiring eighteen months for its completion by the usual monolithic method could be finished in six months by the use of our invention, thus giving the owner the use or rental profit of the building one year sooner.

What we claim is:

1. A building construction comprising preformed concrete columns having reinforcing rods with bends in them, horizontal bearing plates embedded in the columns at the bends of the rods, said rods passing through said plates, performed concrete girders having reinforcing rods, other bearing plates at the ends of the girders, the girder rods passing through said other bearing plates, nuts on the ends of the girder rods bearing against said other bearing plates, and bolts connecting the first bearing plates to said other bearing plates.

2. A building construction comprising preformed concrete columns each having concrete brackets projecting laterally therefrom, a horizontal bearing plate, embedded in the concrete column, having arms projecting laterally from the concrete column, capping the concrete brackets, and bolts molded into the concrete brackets with their heads beneath the arms of the bearing plate and their stems extending up through said arms, and concrete girders each having inverted T-shaped bearing plates, seating on the arms of the bearing plates of the concrete columns at their ends, secured to the bolts of the concrete brackets and longitudinal reinforcing rods having their ends secured to the vertical flanges of the inverted T-shaped bearing plates whereby the latter are secured to the girders.

In testimony whereof, we have hereunto set our hands at Los Angeles, California, this 21st day of June, 1913.

PATRICK J. MAGUIRE.
PAUL R. GOPPOLDT.

In presence of—
ARTHUR P. KNIGHT,
MARTHA M. LANGE.